(12) United States Patent
Han et al.

(10) Patent No.: US 10,088,966 B2
(45) Date of Patent: Oct. 2, 2018

(54) TOUCH SCREEN PANEL AND IMAGE DISPLAY DEVICE INCLUDING THE SAME

(71) Applicant: DONGWOO FINE-CHEM CO., LTD., Jeollabuk-do (KR)

(72) Inventors: Yong Sun Han, Gyeonggi-do (KR); Sung Jin Noh, Gyeonggi-do (KR); Yoo Sung Lee, Gyeonggi-do (KR); Woo Hyun Bae, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 15/534,539

(22) PCT Filed: Nov. 27, 2015

(86) PCT No.: PCT/KR2015/012829
§ 371 (c)(1),
(2) Date: Jun. 9, 2017

(87) PCT Pub. No.: WO2016/093517
PCT Pub. Date: Jun. 16, 2016

(65) Prior Publication Data
US 2017/0329437 A1    Nov. 16, 2017

(30) Foreign Application Priority Data

Dec. 9, 2014 (KR) .......................... 10-2014-0175670

(51) Int. Cl.
*G06F 3/044* (2006.01)
*G06F 3/048* (2013.01)
(Continued)

(52) U.S. Cl.
CPC .............. *G06F 3/044* (2013.01); *G06F 3/048* (2013.01); *G06F 3/0412* (2013.01);
(Continued)

(58) Field of Classification Search
CPC .......... G06F 3/041; G06F 3/044; G06F 3/047; G06F 3/048; G06F 2203/041;
(Continued)

(56) References Cited

U.S. PATENT DOCUMENTS 9,703,424 B2 * 7/2017 Kim .................... G06F 3/044
2009/0242283 A1 * 10/2009 Chiu ..................... G06F 3/044
178/20.01

(Continued)

FOREIGN PATENT DOCUMENTS

JP    2008-98169 A      4/2008
KR   10-2012-0084205 A  7/2012
(Continued)

OTHER PUBLICATIONS

International Search Report for PCT/KR2015/012829.
(Continued)

*Primary Examiner* — Jason Mandeville
(74) *Attorney, Agent, or Firm* — The PL Law Group, PLLC

(57) ABSTRACT

A touch screen panel includes a base substrate, a sensing pattern layer on the base substrate, the sensing pattern layer including a plurality of sensing patterns formed on the base substrate, an insulation layer on the sensing pattern layer, and a bridge electrode formed on the insulation layer to electrically connect unit patterns isolated from each other of the sensing pattern layer. The insulation layer and the bridge electrode satisfy parameters according to specific equations so that a visibility of the bridge electrode on the insulation layer is decreased and an image visibility is improved.

8 Claims, 1 Drawing Sheet

(51) Int. Cl.
*G06F 3/12* (2006.01)
*G06F 3/041* (2006.01)

(52) U.S. Cl.
CPC .. *G06F 3/1209* (2013.01); *G06F 2203/04103* (2013.01); *G06F 2203/04112* (2013.01); *H05K 999/99* (2013.01)

(58) Field of Classification Search
CPC . G06F 2203/04103; G06F 2203/04111; G06F 2203/04112
USPC .......................................................... 345/173
See application file for complete search history.

(56) References Cited

U.S. PATENT DOCUMENTS

2013/0155011 A1* 6/2013 Kim ........................ G06F 3/044
345/174
2014/0015771 A1 1/2014 Shin et al.
2014/0211111 A1* 7/2014 Misaki .................... G06F 3/044
349/12

FOREIGN PATENT DOCUMENTS

| KR | 10-2013-0048686 A | 5/2013 |
| KR | 10-2014-0017274 A | 2/2014 |
| KR | 10-2014-0137631 A | 12/2014 |
| WO | WO 2014-189204 A1 | 11/2014 |

OTHER PUBLICATIONS

Office action dated Jul. 17, 2018 from Korean Patent Office in a counterpart Korean Patent Application No. 10-2014-0175670 (English translation is submitted herewith.).

* cited by examiner

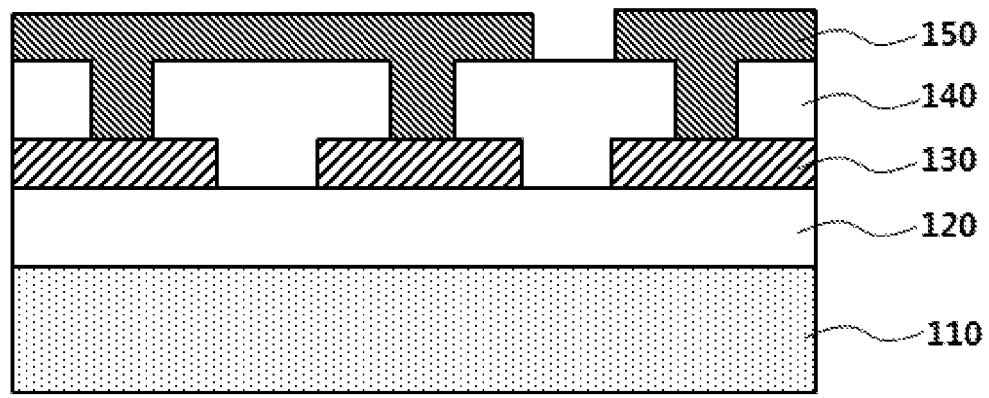

US 10,088,966 B2

TOUCH SCREEN PANEL AND IMAGE DISPLAY DEVICE INCLUDING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/012829, filed Nov. 27, 2015 which claims priority to the benefit of Korean Patent Application No. 10-2014-0175670 filed in the Korean Intellectual Property Office on Dec. 9, 2014, the entire contents of which are incorporated herein by reference.

TECHNICAL FIELD

Example embodiments relate to a touch screen panel and an image display device. More particularly, example embodiments relate to a touch screen panel including a bridge electrode with decreased visibility, and an image display device including the same.

BACKGROUND ART

A touch screen panel commonly includes an input device configured to receive a position information from touching the screen with a user's finger of a user. When the user's finger or an object touches a specific character or position displayed on a screen without using a keyboard, the touch screen panel including a multi-layered structure identifies the position and directly receives data from the screen to process information by an embedded software.

To recognize the touched position without degrading visibility of an image displayed on the screen, a transparent sensing electrode patterned as a predetermined shape may be used.

Examples of a transparent electrode structure widely known in the related art include a glass-ITO film-ITO film (GFF), a glass-ITO film (G1F), a glass only (G2), a glass-2 ITO films (GF2) structure.

The GFF structure has been most commonly used in the touch screen panel, and includes two transparent electrodes (indium tin oxide, ITO) configured to achieve X-axis and Y-axis configurations, and implemented as two films. In the G1F structure, a first ITO is deposited on a rear surface of glass, and a second ITO film is used in a conventional manner. In the G2 structure, an ITO thin film for the X-axis is deposited and patterned on a rear surface of a single reinforced glass, an insulation layer is formed thereon, and an ITO thin film for the Y-axis is patterned. The GF2 structure includes a single reinforces glass and an ITO film similarly to the G2 structure. In the GF2 structure, an ITO thin film for the X-axis is deposited and patterned on the ITO film, an insulation layer is formed thereon, and an ITO thin film for the Y-axis is patterned. The ITO pattern of the GF2 structure may be attached to a curved glass without generating cracks to be applied to a recent curved display such as a wearable display device.

In the G2 and GF2 structures including transparent electrode patterns implemented as X-axis and Y-axis electrodes, a bridge electrode pattern may be formed on the insulation layer for electrically connecting the transparent electrode patterns with each other. In this case, the bridge electrode and sensing patterns (X-axis and Y-axis electrodes) may be visually distinguished from each other. As a reflectance difference between the bridge electrode and the sensing patterns becomes greater, a visual difference may become clear and distinct to degrade a visibility of the display device. Particularly, in a capacitive-type touch panel, transparent electrode patterns are formed on an entire surface of a display area in the display device, and thus the transparent electrode patterns having reduced visibility may be needed.

From the aspect as mentioned above, Japanese Patent Laid-open Publication No. 2008-98169 discloses a transparent conductive film in which an under-coat layer including two layers with different refractive indexes is formed between a transparent substrate and a transparent conductive layer. In an embodiment thereof, a silicon-tin oxide layer having a high refractive index of 1.7 (with a thickness of 10 nm or more), a silicon oxide layer having a low refractive index of 1.43 (with a thickness of 30 nm), and an ITO film having a refractive index of 1.95 (with a thickness of 15 nm) as a transparent conductive layer are sequentially formed. However, the bridge electrode on the insulation layer is also clearly observed even after being attached to the display device, and an image clearance of the display device may not be sufficiently improved.

SUMMARY

In an aspect of the present inventive concepts, a touch screen panel having a bridge electrode with decreased visibility is provided.

In an aspect of the present inventive concepts, an image display device including the touch screen panel is provided.

The above aspects of the present inventive concepts will be achieved by the following characteristics:

(1) A touch screen panel comprising: a base substrate; a sensing pattern layer on the base substrate, the sensing pattern layer including a plurality of sensing patterns formed on the base substrate; an insulation layer on the sensing pattern layer; and a bridge electrode formed on the insulation layer to electrically connect unit patterns isolated from each other of the sensing pattern layer, wherein the insulation layer and the bridge electrode satisfy Equation 1 and Equation 2 below:

$$\frac{\int_{360}^{740} |A(\lambda) - B(\lambda)| d\lambda}{(740 - 360)} \leq 8.0 \quad \text{[Equation 1]}$$

$$-30 \leq B* \leq -15 \quad \text{[Equation 2]}$$

In Equations 1 and 2, $A(\lambda)$ denotes a reflectance of the insulation layer, $B(\lambda)$ denotes a reflectance of the bridge electrode, $\lambda$ denotes a wavelength of a visible light, and $B*$ denotes b* in CIE Lab color coordinates of a reflection light from the bridge electrode within a corresponding wavelength rage.

(2) The touch screen panel according to the above (1), wherein a value represented by Equation 1 is 7.0 or less, and B* is −25 to −17.

(3) The touch screen panel according to the above (1), wherein the bridge electrode has a thickness of 1,400 to 1,800 Å.

(4) The touch screen panel according to the above (1), wherein the sensing pattern layer and the bridge electrode include at least one selected from a group consisting of indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), graphene, a metal wire and a metal mesh.

(5) The touch screen panel according to the above (1), further comprising an index matching layer (IML) formed between the base substrate and the sensing pattern layer.

(6) The touch screen panel according to the above (5), wherein the IML includes at least one selected from a group consisting of zirconium oxide, zinc oxide, niobium oxide, silicon oxide, cerium oxide, indium oxide, titanium oxide, an acrylic compound, and a silicon-based compound.

(7) The touch screen panel according to the above (5), wherein the IML includes at least two layers having different refractive indexes from each other.

(8) An image display device comprising the touch screen panel according to the above (1).

The touch screen panel of the present inventive concepts may satisfy the parameter represented by Equation 1 and Equation 2 regarding reflectance so that visibility of the bridge electrode may be remarkably decreased, and an image display device having high image quality may be achieved.

BRIEF DESCRIPTION OF THE DRAWINGS

FIG. 1 is a cross-sectional view schematically illustrating a touch screen panel according to an embodiment of the present invention.

DETAILED DESCRIPTION OF THE EMBODIMENTS

Example embodiments provide a touch screen panel including: a base substrate; a sensing pattern layer including a plurality of sensing patterns formed on the base substrate; an insulation layer formed on the sensing pattern layer; and a bridge electrode on the insulation layer to electrically connect isolated unit patterns of the sensing pattern layer, wherein the insulation layer and the bridge electrode satisfy Equation 1 and Equation 2. Thus, visibility of the bridge electrode on the insulation layer may be remarkably decreased, and visibility of an implemented image may be improved.

Hereinafter, a preferred embodiment will be described to more concretely understand the present inventive concepts with reference to the accompanying drawing. However, those skilled in the art will appreciate that such embodiments are provided to further understand the spirit of the present invention, and do not limit subject matters to be protected as disclosed in the detailed descriptions and appended claims.

FIG. 1 is a cross-sectional view schematically illustrating a touch screen panel 100 according to an embodiment of the present invention.

The touch screen panel 100 may include a base substrate 110, a sensing pattern layer 130 which may be formed on the base substrate 110 and may include a plurality of sensing patterns, an insulation layer 140 formed on the sensing pattern layer 130, and a bridge electrode 150 which may be formed on the insulation layer 140 to electrically connect unit patterns isolated from each other included in the sensing pattern layer 130.

In the touch screen panel including sensing patterns, insulation layer and bridge electrodes, reflectances between a pattern region and a non-pattern region of the sensing pattern layer, or between a region including the bridge electrode and a region non-overlapping the bridge electrode may be different. Thus, the bridge electrodes and sensing patterns may be visually distinguished from each other. Particularly, the bridge electrode disposed on the insulation layer may form a double-layered structure together with the sensing pattern thereunder, and a visibility of the bridge electrode may be increased, and a visibility of an image to be displayed in an image display device may be decreased.

However, according to example embodiments of the present inventive concepts, the insulation layer 140 and the bridge electrodes 150 may satisfy parameters represented by Equation 1 and Equation 2 below. Thus, the visibility of the bridge electrode may be remarkably decreased by controlling the reflectance between the insulation layer 140 and the bridge electrodes 150. The visibility of the image of the image display device may be also improved by properly maintaining a color range between the touch screen panel and a display black state.

$$\frac{\int_{360}^{740}|A(\lambda)-B(\lambda)|d\lambda}{(740-360)} \leq 8.0 \qquad \text{[Equation 1]}$$

$$-30 \leq B* \leq -15 \qquad \text{[Equation 2]}$$

In the equations above, $A(\lambda)$ denotes a reflectance of the insulation layer, $B(\lambda)$ denotes a reflectance of the bridge electrode, $\lambda$ denotes a wavelength of visible light, and B* denotes b* in CIE Lab color coordinates of a reflection light from the bridge electrodes within a corresponding wavelength rage.

If the value of Equation 1 exceeds 8.0, the visibility of the corresponding pattern may be excessively increased, and if the value of Equation 2 is less than −30 or exceeds −15, a color matching with a display black panel under the touch screen panel may be deviated or disrupted to increase the visibility of the pattern.

The value represented by Equation 1 may be preferably 7.0 or less, and more preferably 6.0 or less. The value represented by Equation 2 may be preferably −25 to −17. Within this range, the visibility of the sensing patterns and the bridge electrode may be further decreased.

The above values or parameters represented by Equation 1 and Equation 2 may be achieved by controlling a thickness, compositions and contents thereof, and process conditions of each target layer, etc. The thickness of the target layer may be a major factor in the parameters.

Hereinafter, each element or structure of the touch screen panel 100 according to an embodiment of the present invention will be described in more detail.

Base Substrate 110

According to example embodiments, the base substrate 110 may include any conventional material used in the related art which may have a proper strength for performing a lamination process of each layer formed thereon, and may be preferably formed of a transparent material.

For example, the base substrate 110 may include glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), cyclo olefin polymer (COP), cyclo olefin copolymer (COC), or the like. Preferably, glass, polyethylene terephthalate or cyclo olefin polymer may be preferably used.

A thickness of the base substrate 110 is not particularly limited. For example, the base substrate 100 may serve as a film having a thickness from about 10 to 150 μm. When using glass, the base substrate 110 may have a thickness from about 200 to 1,100 μm.

Index Matching Layer (IML) 120

According to example embodiments, an IML 120 may be formed between the base substrate 110 and the sensing pattern layer 130. For example, the IML 120 may be formed on the base substrate 110, and then the sensing pattern layer 130 may be formed on the IML 120.

The IML 120 may be configured to improve an optical uniformity of the touch screen panel. For example, differences in optical characteristics due to structural and locational differences may be reduced by the IML 120, and a reflectance difference between a pattern region and a non-pattern region may be also reduced to decrease the visibility of the sensing patterns.

The IML 120 may include any materials generally used in the related art without a particular limitation, and may include, for example, inorganic materials such as zirconium oxide, zinc oxide, niobium oxide, silicon oxide, cerium oxide, indium oxide, and titanium oxide, etc., or organic materials such as an acrylic compound, and silicone compound, etc. These may be used alone or in combination thereof.

The IML 120 may be formed as a single layer having one refractive index, or may include at least two layers having different refractive indexes.

When the IML 120 includes a plurality of layers, the IML 120 may include a high refractive layer/a low refractive layer which may be sequentially formed on the base substrate 110. In this case, a difference in optical characteristics may be further decreased by optimizing a thickness of a high refractive material and a thickness of a low refractive material (the optimization may be changed depending on the thickness and material of the sensing pattern), so that the visibility of the sensing patterns may be decreased.

The refractive index of the IML 120 may not be specifically limited, for example, may be in a range from about 1.45 to about 2.5. If the IML 120 is formed to include the high refractive layer/the low refractive layer, the refractive indexes of the high and low refractive layers may be 1.55 to 2.5, and 1.45 to 1.95, respectively. Within the above range, the difference in optical characteristics due to the structural and locational difference of each pattern may be minimized.

A thickness of the IML 120 may not be specifically limited, for example, may be in a range from about 10 Å to about 1000 Å, and preferably, from about 50 Å to about 200 Å. If the IML 120 is formed of an organic film, the thickness may be in a range from about 0.5 μm to about 10 μm, preferably in a range from about 1 μm to about 3 μm.

A method of forming the IML 120 may not be specifically limited, for example, may be formed by a gravure coating, a vacuum vapor deposition, a sputtering, an ion plating, or the like as a thin film form.

Sensing Pattern Layer 130

According to example embodiments, the sensing pattern layer 130 may be formed on the base substrate 110, and may include a plurality of sensing patterns. If the touch screen panel further includes the above-described IML 120, the sensing pattern layer 130 may be formed on the IML 120.

The sensing pattern layer 130 may serve as an electrode for providing information on coordinates of a touched position, and the plurality of the sensing patterns may include unit patterns arranged along a row direction or a column direction.

The unit pattern may be configured to provide information on X and Y coordinates of the touched position. For example, the plurality of the sensing patterns may include first sensing patterns and second sensing patterns. The first and second sensing patterns may be respectively disposed in the row direction or the column direction to provide the information on the X and Y coordinates of the touched position. For example, when a user's finger or an object touches a transparent substrate, a change in capacitance depending on a contact position may be detected and transferred to a driving circuit through the first and second sensing patterns, and a position detecting line. Then, the change in capacitance may be converted into an electrical signal by X and Y input processing circuits to identify the contact position.

The sensing pattern layer 130 may be formed of any conductive material that may be capable of satisfying the above-described parameters of Equations 1 and 2, preferably, a transparent component. For example, the sensing pattern layer 130 may include indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), a metal wire, a metal mesh, etc. These may be used alone or in combination thereof. Preferably, ITO may be used. The metal wire or the metal mesh may include, for example, silver (Ag), gold, aluminum, copper, iron, nickel, titanium, tellurium, chromium, etc. These may be used alone or in combination thereof.

A method of forming the sensing pattern layer 130 may not be specifically limited, and may include, for example, a physical vapor deposition (PVD), a chemical vapor deposition (CVD) or the like. For example, the sensing pattern layer 130 may be formed by a reactive sputtering which is an example of the PVD.

Additionally, the sensing patterns 130 may be formed by a printing process. For example, various printing methods such as a gravure off-set printing, a reverse off-set printing, a screen printing, a gravure printing, etc., may be utilized. When the sensing patterns 130 are formed by the printing process, the sensing patterns may be formed of a printable paste material. For example, the sensing patterns 130 may be formed of a carbon nano tube (CNT), a conductive polymer, and Ag nano wire ink.

A thickness of the sensing pattern layer 130 may not be specifically limited, for example, may be about 10 to 200 nm, and preferably, about 10 to 30 nm. Within the above range, the visibility of the sensing patterns may be efficiently decreased.

A transmittance of the sensing pattern layer 130 may not be specifically limited, for example, may be about 80% or more, and preferably about 90% or more. A surface resistance of the sensing pattern layer 130 may not be specifically limited, for example may be about 150Ω or less, and preferably about 130Ω or less. Within the above ranges, the visibility of the sensing patterns may be efficiently decreased.

Insulation Layer 140

According to example embodiments, the insulation layer 140 may be formed on the sensing pattern layer 130.

To electrically insulate the respective sensing patterns from each other, the insulation layer 140 may be selectively formed on the sensing pattern layer 130. A region at which the insulation layer 140 is not formed may be referred to as a contact hole, and the sensing patterns may be electrically connected to each other through the contact hole.

The insulation layer 140 may be formed of any insulating interlayer material that may be capable of satisfying the above-described parameters of Equations 1 and 2. For example, the insulation layer 140 may be formed in a desired pattern using an inorganic oxide such as silicon oxide, or a transparent photosensitive resin including an acrylic resin. A thickness of the insulation layer 140 may not be specifically limited, for example, may be about 1 to 5 μm, and preferably about 1.5 to 3.0 μm. Within the above range, the parameters represented by Equations 1 and 2 may be effectively obtained.

Bridge Electrode 150

According to example embodiments, the bridge electrodes 150 may be formed on the insulation layer 140 to electrically connect isolated unit patterns of the sensing pattern layer 130.

For example, the sensing pattern layer 130 may include the first sensing patterns for providing the information on the X coordinate which may be connected with each other, and the second sensing patterns for providing the information on the Y coordinate may be separated from each other in an island form. In this case, the bridge electrode 150 may be configured to electrically connect the second sensing patterns.

The bridge electrodes 150 may be formed toward a visible side, and a double-layered structure may be formed together with the sensing pattern. Thus, the bridge electrode 150 may become visible due to a locational difference. However, the touch screen panel of the present inventive concepts may be formed to satisfy the relation of Equations 1 and 2, and the visibility of the bridge electrode 150 may be remarkably decreased.

The bridge electrodes 150 may be formed of the material substantially the same as that of the sensing pattern layer 130.

A thickness of the bridge electrode 150 may not be specifically limited, for example may be about 1,400 to 1,800 Å, and preferably about 1,500 to 1,700 Å. Within the above range, the relation of Equations 1 and 2 may be efficiently achieved.

In some embodiments, the touch screen panel may further include an additional insulation layer, a protective film layer, a passivation layer, an adhesive layer, etc., within a scope without departing from the present inventive concepts.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLES AND COMPARATIVE EXAMPLES (1) Example 1

A PET film was used as the base substrate 110, a doubled layer including a ZrO$_2$ layer (refractive index: 2.37) having a thickness of 20 nm and an SiO$_2$ layer (refractive index: 1.46) having a thickness of 20 nm was formed by a gravure method as the IML 120, and the sensing pattern layer 130 including the first sensing patterns and the second sensing patterns was formed by the physical vapor deposition and a photo-lithography process in a thickness of 20 nm. Next, the insulation layer 140 was formed on the sensing pattern layer 130 using an acrylic insulation material in a thickness of 1.5 μm (step 1).

The bridge electrode 150 for electrically connecting the second sensing patterns were formed according to conditions of Examples and Comparative Examples (step 2) to obtain a touch screen panel (step 2).

After performing step 1, a reflectance of the insulation layer was measured using CM-2600d of Minolta, Inc., and after performing step 2, a reflectance of the bridge electrode was measured. Further, b* value in CIE Lab color coordinates of a reflection light of the bridge electrode was measured using CM-2600d of Minolta, Inc. (the same apparatus as the above), and values calculated according to Equations 1 and 2 are shown in Table 1 below.

(2) Examples 2 to 15 and Comparative Examples 1 to 11

Touch screen panels were prepared according to the same procedure as described in Example 1 below, except that the bridge electrodes were formed using conditions, materials listed and thicknesses described in Table 1 below (a power for forming the bridge electrodes is appropriately modified so as to obtain a required thickness).

TABLE 1

| Section | O$_2$ (sccm) | Insulation layer (thickness (μm)/ material) | Bridge electrode (thickness (Å)/material) | Equation 1 | Equation 2 |
| --- | --- | --- | --- | --- | --- |
| Example 1 | 2 | 1.5/acrylic | 1600/ITO | 6.1 | −23.6 |
| Example 2 | 3 | 1.5/acrylic | 1600/ITO | 6.5 | −23 |
| Example 3 | 4 | 1.5/acrylic | 1600/ITO | 6.8 | −23.2 |
| Example 4 | 2 | 1.5/acrylic | 1550/ITO | 6.2 | −21.9 |
| Example 5 | 3 | 1.5/acrylic | 1550/ITO | 6.4 | −22.1 |
| Example 6 | 4 | 1.5/acrylic | 1550/ITO | 6.7 | −21.3 |
| Example 7 | 2 | 1.5/acrylic | 1500/ITO | 6.3 | −19.8 |
| Example 8 | 3 | 1.5/acrylic | 1500/ITO | 6.3 | −19.5 |
| Example 8 | 4 | 1.5/acrylic | 1500/ITO | 6.6 | −19.2 |
| Example 10 | 2 | 1.5/acrylic | 1400/ITO | 5.3 | −15.1 |
| Example 11 | 3 | 1.5/acrylic | 1400/ITO | 5.4 | −15.3 |
| Example 12 | 4 | 1.5/acrylic | 1400/ITO | 5.6 | −15.2 |
| Example 13 | 2 | 2.0/acrylic | 1600/ITO | 6.3 | −23.2 |
| Example 14 | 3 | 2.0/acrylic | 1600/ITO | 6.2 | −23.2 |
| Example 15 | 4 | 2.0/acrylic | 1600/ITO | 6.7 | −23.3 |
| Comparative Example 1 | 2 | 1.5/acrylic | 1350/ITO | 5.3 | −12.3 |
| Comparative Example 2 | 3 | 1.5/acrylic | 1350/ITO | 5.1 | −11.7 |
| Comparative Example 3 | 4 | 1.5/acrylic | 1350/ITO | 5.6 | −12.1 |
| Comparative Example 4 | 2 | 1.5/acrylic | 1000/ITO | 5.9 | 11.21 |
| Comparative Example 5 | 3 | 1.5/acrylic | 1000/ITO | 6.1 | 10.01 |
| Comparative Example 6 | 4 | 1.5/acrylic | 1000/ITO | 6.6 | 9.51 |
| Comparative Example 7 | 2 | 1.5/acrylic | 850/ITO | 9.2 | 7.7 |
| Comparative Example 8 | 3 | 1.5/acrylic | 850/ITO | 9.4 | 7.07 |
| Comparative Example 9 | 4 | 1.5/acrylic | 850/ITO | 11.7 | 7.5 |
| Comparative Example 10 | 2 | 1.5/acrylic | 750/ITO | 9.5 | −2.59 |
| Comparative Example 11 | 3 | 2.0/acrylic | 750/ITO | 10.8 | −4.19 |

Test Procedure—Evaluation of Visibility

Two polarizing plates were adhered to the touch screen panels prepared according to Examples and Comparative examples using OCA in a black state such that the plates were vertically arranged. 100 test panel members visually observed the bridge electrodes while irradiating the polarizing plates with a three-wavelength lamp to determine the visibility of the bridge electrode. The number of the test panel members determining to visually observe the bridge electrodes was counted. The results are shown in Table 2 below.

TABLE 2

| Section | Visibility (number of the test panel members) |
|---|---|
| Example 1 | 3 |
| Example 2 | 5 |
| Example 3 | 5 |
| Example 4 | 5 |
| Example 5 | 3 |
| Example 6 | 4 |
| Example 7 | 4 |
| Example 8 | 5 |
| Example 8 | 10 |
| Example 10 | 13 |
| Example 11 | 18 |
| Example 12 | 15 |
| Example 13 | 5 |
| Example 14 | 5 |
| Example 15 | 5 |
| Comparative Example 1 | 59 |
| Comparative Example 2 | 56 |
| Comparative Example 3 | 57 |
| Comparative Example 4 | 76 |
| Comparative Example 5 | 77 |
| Comparative Example 6 | 78 |
| Comparative Example 7 | 79 |
| Comparative Example 8 | 80 |
| Comparative Example 9 | 85 |
| Comparative Example 10 | 75 |
| Comparative Example 11 | 80 |

As shown in the above Table 2, when satisfying the parameters of Equations 1 and 2 according to the present inventive concepts, the visibility of the bridge electrodes and other lower electrodes was remarkably decreased. Therefore, the touch screen panel of Examples may be suitably applied to the image display device.

What is claimed is:

1. A touch screen panel comprising:
a base substrate;
a sensing pattern layer on the base substrate, the sensing pattern layer including a plurality of sensing patterns formed on the base substrate;
an insulation layer on the sensing pattern layer; and
a bridge electrode formed on the insulation layer to electrically connect unit sensing patterns isolated from each other included in the sensing pattern layer,
wherein a thickness, composition, content, and process condition of the insulation layer and the bridge electrode are controlled to satisfy Equation 1 and Equation 2 below:

$$\frac{\int_{360}^{740} |A(\lambda) - B(\lambda)| d\lambda}{(740 - 360)} \leq 8.0 \quad \text{[Equation 1]}$$

$$-30 \leq B* \leq -15 \quad \text{[Equation 2]}$$

wherein, in Equations 1 and 2, $A(\lambda)$ denotes a reflectance of the insulation layer, $B(\lambda)$ denotes a reflectance of the bridge electrode, $\lambda$ denotes a wavelength of a visible light, and
B* denotes b* in CIE Lab color coordinates of a reflection light from the bridge electrode.

2. The touch screen panel according to claim 1, wherein a value represented by Equation 1 is 7.0 or less, and B* is −25 to −17.

3. The touch screen panel according to claim 1, wherein the bridge electrode has a thickness of 1,400 to 1,800 Å.

4. The touch screen panel according to claim 1, wherein the sensing pattern layer and the bridge electrode include at least one selected from a group consisting of indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), graphene, a metal wire and a metal mesh.

5. The touch screen panel according to claim 1, further comprising an index matching layer (IML) formed between the base substrate and the sensing pattern layer.

6. The touch screen panel according to claim 5, wherein the IML includes at least one selected from a group consisting of zirconium oxide, zinc oxide, niobium oxide, silicon oxide, cerium oxide, indium oxide, titanium oxide, an acrylic compound, and a silicon-based compound.

7. The touch screen panel according to claim 5, wherein the IML includes at least two layers having different refractive indexes from each other.

8. An image display device comprising the touch screen panel according to claim 1.

* * * * *